United States Patent [19]
Combes et al.

[11] Patent Number: 6,054,179
[45] Date of Patent: *Apr. 25, 2000

[54] PROCESSES FOR THE PREPARATION OF COLORANTS

[75] Inventors: James R. Combes, Burlington, Canada; Carl P. Tripp, Orono, Me.; Richard P. N. Veregin, Mississauga; Daniel A. Foucher, Toronto, both of Canada

[73] Assignee: Xerox Corporation, Stamford, Conn.

[ * ] Notice: This patent is subject to a terminal disclaimer.

[21] Appl. No.: 09/201,208

[22] Filed: Nov. 30, 1998

[51] Int. Cl.$^7$ .................................................. B05D 7/00
[52] U.S. Cl. .................... 427/212; 427/215; 427/219; 427/220
[58] Field of Search ...................... 427/212, 213, 427/215, 218, 219, 220

[56] References Cited

U.S. PATENT DOCUMENTS

| | | | |
|---|---|---|---|
| 4,298,672 | 11/1981 | Lu | 430/108 |
| 4,338,390 | 7/1982 | Lu | 430/106 |
| 4,368,970 | 1/1983 | Hays | 355/3 DD |
| 4,394,429 | 7/1983 | Hays | 430/102 |
| 4,600,677 | 7/1986 | Hoffend et al. | 430/108 |
| 5,002,846 | 3/1991 | Creatura et al. | 430/108 |
| 5,015,550 | 5/1991 | Creatura et al. | 430/108 |
| 5,312,882 | 5/1994 | DeSimone et al. | 526/201 |
| 5,376,172 | 12/1994 | Tripp et al. | 106/490 |
| 5,376,494 | 12/1994 | Mahabadi et al. | 430/137 |
| 5,714,299 | 2/1998 | Combes et al. | 427/216 |
| 5,725,987 | 3/1998 | Combes et al. | 427/219 |

*Primary Examiner*—Shrive Beck
*Assistant Examiner*—Paul D. Strain
*Attorney, Agent, or Firm*—E. O. Palazzo

[57] ABSTRACT

A process which comprises maintaining a mixture of carbon dioxide, surface treating agent and colorant at a temperature of from about −10° C. to about 200° C., and optionally removing carbon dioxide.

35 Claims, No Drawings

PROCESSES FOR THE PREPARATION OF COLORANTS

PENDING APPLICATIONS

Illustrated in U.S. Pat. No. 5,725,987, and pending U.S. Ser. No. 839,273, commonly assigned the disclosures of each application being totally incorporated herein by reference, are, for example, processes for the preparation of toner additives, such as metal oxides, with liquid carbon dioxide, and a process for the preparation of wax with carbon dioxide. The appropriate components and processes of these applications may be selected for the present invention in embodiments thereof.

BACKGROUND OF THE INVENTION

This invention is generally directed to a process for the preparation of colorants, and more specifically, the present invention relates to processes for obtaining colorants that can be selected for dry toners and inks, such as ink jet inks. In embodiments, the present invention relates to the chemical treatment of colorants in liquid carbon dioxide, or supercritical fluid (SCF) carbon dioxide. The present invention relates in embodiments to the preparation of colorants like pigments selected for toners, which toners are useful for the development of images in xerographic imaging and printing methods. More specifically, the present invention relates to the preparation of colorants in a supercritical fluid, such as supercritical carbon dioxide. With the processes of the present invention no or minimal solvent residue results, there are enabled colorant products wherein no or minimal solvent waste exists, colorant agglomeration is avoided, or minimized, and color degradation is avoided, or minimized. Also, there is enabled with the processes of the present invention complete and clean removal of the carbon dioxide solvent from the colorant product without costly and cumbersome solvent separation methods. Further, the use of a carbon dioxide medium eliminates the need for solvent disposal since, for example, at atmospheric conditions, carbon dioxide spontaneously separates from solids, thus no liquid waste is generated. Also, some treating agents, or components, such as fluorosilanes which are useful for modifying the surface characteristics (such as surface energy, contact angle, etc.) of pigments, are more soluble in carbon dioxide as compared to their solubility in conventional liquid hydrocarbon solvents. One specific example of a potentially advantageous medium for the colorant preparation is supercritical fluid (SCF) carbon dioxide, with the critical temperature of $CO_2$ being about 31° C. Since an operating temperature of approximately 31° C. or higher could render the solution into the SCF regime, operation of the process is potentially more economically viable than operation in the liquid phase of carbon dioxide or in conventional liquids in view of the higher reactivity of treating reagents at higher temperatures. What primarily distinguishes a supercritical fluid from a vapor is that no meniscus can be discerned in the fluid phase regardless of the pressure applied.

PRIOR ART

The use of supercritical carbon dioxide for the synthesis of polymers by a certain process is illustrated in U.S. Pat. No. 5,312,882, the disclosure of which is totally incorporated herein by reference.

A number of toner colorants, such as pigments are known, such as carbon black, cyan, magenta, yellow, red, orange, and the like. These pigments are usually surface treated in conventional liquid solvents, such as toluene or cyclohexane. These conventional liquid solvents typically generate waste liquids after surface treatment, requiring tedious and expensive solvent disposal procedures. An additional difficulty is that the treated pigment product is often in the form of a coagulum, which must be filtered, dried and ground prior to use in ink or toner.

Therefore, a need exists for a surface treatment process for colorants, such as pigments that can be selected for dry toners, ink jet inks, and photogenerating components in a layered photoconductive imaging member, in which no solvent separation or purification procedures are required subsequent to surface treatment. An additional need resides in processes for the elimination of toxic and/or flammable liquid solvents, and for an economical surface treating solvent that does not engender a color change of the colorant by extracting dye molecules from the colorant matrix during surface treatment. There is also a need for a solvent which does not give rise to a solid coagulum of pigment particles following surface treatment, for a solvent of low reactivity and excellent solvent strength for low molar mass surface reagents, and for a solvent of low viscosity (for example, $10^{-4}$ Pascal-seconds and below) such that the surface treating reagent, such as for example 1,1,1-trifluoropropyl trimethoxysilane or aminopropyl triethoxysilane, can transport to the surface of the pigment in a reasonably rapid manner for example in under five minutes and preferably from 1 to 2 minutes and such that agitation of the reactor contents can transpire without undue power requirements for the agitator, for example in excess of 0.25 horsepower per 100 gram batch of pigment. These and other needs and advantages are believed achievable with the processes of the present invention, and more specifically, with liquid carbon dioxide, or supercritical fluid carbon dioxide, which is nontoxic and nonflammable, separates completely and spontaneously from suspended solids (i.e., the pigment), and yields little or no solid coagulum subsequent to treatment with surface modifying reagents such as 1,1,1-trifluoropropyl trimethoxysilane or aminopropyl triethoxysilane.

SUMMARY OF THE INVENTION

Examples of features of the present invention include:

It is an feature of the present invention to provide colorants and processes thereof with many of the advantages illustrated herein.

In another feature of the present invention there are provided chemical treatment processes for generating toner colorants.

In yet another feature of the present invention there are provided supercritical fluid carbon dioxide processes for the preparation of toner pigments.

Moreover, in another feature of the present invention there are provided economical and substantially waste free processes for the preparation of toner pigments.

Further, in another feature of the present invention there are provided processes for the preparation of toner colorants, wherein conventional liquid solvents and more specifically, halogenated solvents are avoided.

Another feature of the present invention resides in improved processes for the preparation of toner colorants that do not require costly and elaborate solvent separation methodologies.

Moreover, in another feature of the present invention there are provided processes with supercritical carbon dioxide for the preparation of colorants wherein mass transport limitations are avoided or minimized since the carbon dioxide possesses in embodiments a viscosity (from $10^{-5}$ to $10^{-4}$ Pascal-seconds) of from one to two orders of magnitude lower than the prior art conventional liquid solvent based processes (which range from $10^{-3}$ to $10^{-2}$ Pascal-seconds).

Also, in another feature of the present invention there are provided positively charged toner compositions, or negatively charged toner compositions having admixed therewith carrier particles, preferably with a coating thereover.

There are provided in aspects of the present invention processes for the preparation of colorants, and more specifically, processes for the preparation of toner colorants, such as pigments wherein supercritical fluids, such as supercritical fluid carbon dioxide, or supercritical carbon dioxide, are selected. Also, in embodiments of the invention there can be selected for the preparation of the colorants liquid carbon dioxide.

Aspects of the present invention relate to a process which comprises maintaining a mixture of carbon dioxide, surface treating agent and colorant at a suitable temperature preferably of from about –10° C. to about 200° C., and optionally removing carbon dioxide; a process wherein the temperature is maintained at from about 0 to about 50° C., and wherein the carbon dioxide is removed; a process wherein the temperature of from about –10° C. to about 200° C. is maintained for a period of time of from about 5 to about 240 minutes; a process wherein the maintaining temperature of from about –10° C. to about 200° C. is for a period of from about 10 to about 60 minutes; a process wherein the colorant is a pigment, or a dye; a process wherein the colorant is carbon black; a process wherein the colorant is cyan, yellow, green, magenta, or mixtures thereof; a process wherein the colorant is selected in an amount of from about 1 to about 1,000 weight per volume percent, or grams per 100 milliliters of reactor volume; a process wherein the mass ratio amount of carbon dioxide to colorant or grams of carbon dioxide divided by the grams of colorant being treated is from 0.1:1 to about 20:1; a process wherein there is obtained a toner colorant of a size diameter of from about 5 to about 500 nanometers; a process wherein a closed reactor vessel is selected, the temperature in the reactor is maintained at from about 80° C. to about 150° C., and the pressure in the reactor is from about 20 to about 300 bar; a process wherein the pressure in the reactor is from about 30 to about 50 bar; a process wherein the reactor contents are stirred with a device operating at a speed of from about 1 to about 200 revolutions per minute, and wherein the reactor is depressurized, and wherein subsequent to depressurization the product is removed; a process wherein the colorant is a pigment; a process wherein the amount of pigment is from about 1 to about 300 w/V percent, or about 1 to about 300 grams of pigment for every 100 milliliters of reactor volume; a process wherein the mixture is maintained at a temperature of from about 80° C. to about 150° C., and the pressure is from about 30 to about 1,000 bar, and wherein the mixing and heating are accomplished in a closed reactor; a process wherein supercritical carbon dioxide is selected and wherein the temperature is at least about 32° C.; a process wherein liquid carbon dioxide is selected and wherein the temperature during the process is below about 32° C.; a process wherein there is enabled minimal colorant aggregation and substantially no color degradation; a process for the preparation of a colorant, and which colorant is substantially free of color degradation, the process comprising maintaining a mixture of carbon dioxide and colorant at a temperature of from about –10° C. to about 200° C.; a process wherein the carbon dioxide is liquid carbon dioxide; a process wherein the temperature is about 0 to about 40° C.; a process wherein the colorant is a pigment with a size diameter of about 0.01 to about 1 micron is volume average diameter; a process wherein the mixture contains a surface treating reagent; a process wherein the surface treating reagent is aminopropyl triethoxysilane; a process wherein there is obtained a toner colorant of a size diameter of from about 10 to about 30 nanometers; a process wherein the colorant is selected in an amount of from about 10 to 50 weight per volume percent; a process which comprises maintaining a mixture of carbon dioxide, surface treating reagent and colorant at a temperature of from about –10° C. to about 100° C.; a process wherein a cooling is accomplished to about 30° C. from about 35° C. to about 200° C.; a process wherein the surface treating agent is a silane; processes which comprise maintaining the temperature of a mixture of a colorant component and carbon dioxide at, for example, from about –10° C. to about 200° C., and preferably from about 50 to about 70° C., maintaining this temperature for an effective time, for example from about 5 to about 60 minutes, and adding with, for example, a high pressure pump, a surface treating agent in the amount of from 0.1 weight percent to 30 weight percent relative to the amount of colorant to be treated, such treating agent being, for example, dimethylaminopropyl trimethoxysilane, diethylphosphatoethyl triethoxysilane, carboxymethyl triethoxysilane, aminopropyl triethoxysilane and the like with a preferred amount range of, for example, from about 1.0 to about 5.0 weight percent, and maintaining this temperature (from about –10° C. to about 200° C. and preferably from about 50° C. to about 70° C.) for an effective time of, for example, from about 5 to about 240 minutes; removing the carbon dioxide by, for example, depressurizing and wherein the removed carbon dioxide, which may contain impurities, such as methanol or triethylamine, is isolated and potentially reused.

Specific embodiments of the present invention include inserting the desired amount, for example from about 1 to about 1,000 w/V percent, 1 to 1,000 grams per 100 milliliters of reactor volume, of colorant in a high pressure reactor. The reactor is then sealed and either evacuated or purged with an inert atmosphere with, for example, $N_2$ or Ar. The primary purpose of the purging is to remove from about 95 percent to about 99 percent of atmospheric water from the reactor. The contents of the reactor are then exposed to an amine, such as triethylamine (or any Lewis base, such as ammonia) vapor for about 30 minutes. The purpose of the amine is to activate the surface to the surface reagent. The reactor is then evacuated with a vacuum to achieve a base catalysis for a surface condensation reaction consistent with U.S. Pat. No. 5,376,172, the disclosure of which is totally incorporated herein by reference, which discloses a process for the surface modification of metal oxides. The reactor is then brought up to the desired temperature for the reaction, which with SCF $CO_2$ is in the range of, for example, from about 31° C. to 200° C. and for liquid carbon dioxide is from –10° C. to 30° C. Many of the surface reactions can proceed readily at relatively low SCF temperatures (~40° C.). The higher temperatures near 200° C. might present kinetic advantages, and such temperatures are of importance for the reaction of certain reagents with the colorant surface. The carbon dioxide is then introduced into the vessel via a high pressure pump or compressor. Sufficient carbon dioxide to yield an overall fluid density of a range from about 0.7 to about 1.8 g/cc is introduced for treatments in SCF carbon dioxide and sufficient liquid carbon dioxide is added to completely immerse the colorant to be treated in a liquid phase, from 0.5 to about 1.0 grams of liquid carbon dioxide per gram of pigment or colorant being treated. Depending on the temperature chosen, the generated pressure that results from this addition of $CO_2$ can range from about 40 to about 700 bar. Agitation of the resulting dispersion of the colorant in $CO_2$ is then commenced with an impeller at a rotational speed of from about 1 to about 200 rpm, with the preferred speed being from about 10 to about 50 rpm. Gentle agitation, about 10 to about 50 rpm for the duration of the reaction, is generally employed to minimize, or avoid erosive wear of the colorant against the metal surfaces of the reactor. After agitation has commenced, a surface treating reagent, generally an organosilane but potentially any species that reacts with the colorant, such as pigment surface such as an organic isocyanate, carboxylic acid or ester, metal or organic alkoxide, and the like is introduced into the carbon dioxide solution via a high pressure pump. The operating pressure range for this addition is, for example, from about 40 to about 700 bar, with the preferred range being from about 40 to about 200 bar. Alkylalkoxysilanes are typically used to treat the colorants as they react with surface OH groups to yield a covalently bound layer of the surface treating reagent to the colorant, such as a pigment. Reaction byproducts diffuse from the surface and are dissolved in the SCF or liquid $CO_2$ solution. The reactor is then maintained at the desired temperature and pressure for from, for example, about 5 to about 250 minutes. Subsequently, the reactor is slowly depressurized, for example, over a 30 minute time period, via throttling a valve until the pressure inside the is reactor reaches atmospheric pressure, about 1 bar. An inert atmosphere of, for example, argon is then introduced into the reactor to prevent any atmospheric moisture from being introduced into the system. The reactor is then cooled to below 30° C., and more specifically, to about 25° C., primarily to aid in handling and removal of the treated solid product. The product resulting is a surface modified colorant that can then be used for toner or ink formulations.

Examples of colorants, such as pigments that can be selected for the processes of the present invention include, but are not limited to carbon black, cyan pigments, such as copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like, magenta pigments, such as Pigment Red 81:3 and 1,9-dimethyl-substituted quinacridone and anthraquinone dye identified in the Color Index as Cl 60720, Cl Dispersed Red 15, a diazo dye identified in the Color Index as Cl 26050, Cl Solvent Red 19, and the like, yellow, such as, diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide, phenylazo-4'-chloro-2,5-dimethoxy acetoacetanilide, permanent yellow FGL, and the like, and the particle size thereof is for example, from about 5 to about 500 nanometers, or from about 25 to about 300 nanometers.

Known dyes can be selected, such as red, green, brown, blue, orange, yellow, and the like. More specifically, a number of preferred colorants are 1,9-dimethyl-substituted quinacridone and anthraquinone dye identified in the Color Index as Cl 60720, Cl Dispersed Red 15, a diazo dye identified in the Color Index as Cl 26050, Cl Solvent Red 19, and the like; copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide, phenylazo-4'-chloro-2,5-dimethoxy acetoacetanilide, permanent yellow FGL, pigment blue 15:3, and the like. These colorants are generally present in the toner composition in an amount of from about 1 weight percent to about 15 weight percent based on the weight of the toner resin particles.

Embodiments of the present invention include a process wherein there is obtained a toner colorant of a size diameter of from about 5 to about 500 nanometers with a preferred range being from 10 to 30 nanometers; a process wherein a closed reactor vessel is selected, the temperature in the reactor is maintained at from about 0 to about 150° C., and the pressure in the reactor is from about 30 to about 300 bar; and a process wherein the pressure in the reactor is from about 40 to about 70 bar; wherein the reactor contents are stirred with a device operating at a speed of from about 1 to about 200 revolutions per minute, and wherein the reactor is depressurized, to and wherein subsequent to depressurization, the product is removed.

The treated colorants, that is surface treatment wherein a component is reacted or attached to the surface, and wherein the thickness of the resulting coating may be from about 10 to about 1,000 nanometers, and more specifically, said colorant is coated with, for example, from about 0.1 to about 30 weight percent of a surface reagent with a preferred range amount being from about 1 to about 5 weight percent thereof, and for example, from about 0.1 to about 30 weight percent relative to the amount of colorant. The surface treating reagents, include dimethylaminopropyl trimethoxysilane, diethylphosphatoethyl triethoxysilane, carboxymethyl triethoxysilane, and aminopropyl triethoxysilane or potentially any organosilane reagent, such as an alkylalkoxysilane (such as octyltriethoxysilane, decyltrimethoxysilane or isobutyltrimethoxysilane), or a chlorosilane (such as octadecyltrichlorosilane or methyl-n-octyldichlorosilane) or an isocyanate (such as methylisocyanate), carboxylic acid or ester (such as acetic acid or ethyl acetate) or metal or organic alkoxide (such as lithium t-butoxide), and more specifically, dimethylaminopropyl trimethoxysilane, diethylphosphatoethyl triethoxysilane, carboxymethyl triethoxysilane, decyltrimethoxysilane and octadecyltrichlorosilane.

The treated colorant obtained with the processes of the present invention can be selected for toner compositions, and wherein there are present resin, especially thermoplastic resin, treated colorant and charge control agent and other known additives. Illustrative examples of finely divided toner resins selected for the toner include known thermoplastics, such as polyamides, epoxies, polyurethanes, diolefins, vinyl resins and polymeric esterification products of a dicarboxylic acid and a diol comprising a diphenol, and extruded polyesters as illustrated in U.S. Pat. No. 5,376,494, the disclosure of which is totally incorporated herein by reference. Specific vinyl monomers that can be used are styrene, p-chlorostyrene, vinyl naphthalene, unsaturated mono-olefins such as ethylene, propylene, butylene and isobutylene; vinyl halides such as vinyl chloride, vinyl bromide, vinyl fluoride, vinyl acetate, vinyl propionate, vinyl benzoate, and vinyl butyrate; vinyl esters like the esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloracrylate, methyl methacrylate, ethyl methacrylate, and butyl methacrylate; acrylonitrile, methacrylonitrile, acrylamide, and the like. Also, styrene butadiene copolymers, mixtures thereof, and other similar known thermoplastic toner resins can be selected.

As one toner resin there can be selected the esterification products of a dicarboxylic acid and a diol comprising a diphenol, reference U.S. Pat. No. 3,590,000, the disclosure of which is totally incorporated herein by reference. Other toner resins include styrene/methacrylate copolymers; styrene/butadiene copolymers; polyester resins obtained from the reaction of bisphenol A and propylene oxide; and branched polyester resins resulting from the reaction of dimethylterephthalate, 1,3-butanediol, 1,2-propanediol and pentaerythritol.

Numerous well known suitable colorants, such as pigments, dyes, mixtures thereof, and the like can be selected as the colorant for the toner including, for example, carbon black, nigrosine dye, lamp black, iron oxides, magnetites, and mixtures thereof. The colorant, which is preferably carbon black, should be present in a sufficient amount to render the toner composition highly colored. Thus, the colorant particles can be present in amounts of for example, of from about 2 percent by weight to about 20, and preferably from about 4 to about 10 percent by weight, based on the total weight of the toner composition. Colorant includes pigment, dye, mixtures thereof, mixtures of pigments, mixtures of dyes, and the like.

When the pigment particles are comprised of magnetites, which are a mixture of iron oxides ($FeO.Fe_2O_3$), including those commercially available as MAPICO BLACK®, they are present in the toner composition in an amount of from about 10 percent by weight to about 70 percent by weight, and preferably in an amount of from about 20 percent by weight to about 50 percent by weight.

The resin is present in a sufficient, but effective amount, thus when 10 percent by weight of pigment, or colorant such as carbon black is contained therein, about 90 percent by weight of resin material is selected. Generally, the toner composition is comprised of from about 85 percent to about 97 percent by weight of toner resin particles, from about 3 percent by weight to about 15 percent by weight of pigment particles, such as carbon black, and the surface treated additives in effective amounts of, for example, from about 0.05 to about 10, and from about 1 to about 2 weight percent.

For further enhancing the positive charging characteristics of the toner compositions, and as optional components there can be incorporated herein charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate, and other known charge additives, including negative charge additives, such as BONTRON E-88®, TRH, and similar aluminum complexes. These additives are usually incorporated into the toner in an amount of from about 0.1 percent by weight to about 20 percent by weight.

The toner composition with an average volume size diameter of from about 5 to about 20 microns can be prepared by a number of known methods including melt blending the toner resin particles, and pigment particles or colorants, followed by mechanical attrition. Other methods include those well known in the art such as spray drying, melt dispersion, dispersion polymerization and suspension polymerization. In one dispersion polymerization method, a solvent dispersion of the resin particles and the pigment particles are spray dried under controlled conditions to result in the desired product. Thereafter, there is added to the toner the additives obtainable with the processes of the present invention and which additives are selected in various effective amounts, such as for example from about 0.05 to about 3, and preferably from about 0.9 to about 2 weight percent.

Also, the toner and developer compositions, that is toner and carrier, reference for example U.S. Pat. Nos. 5,015,550; 5,002,846; and 4,600,677, the disclosures of which are totally incorporated herein by reference, may be selected for use in electrostatographic imaging and printing processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines, vanadyl phthalocyanines, titanyl phthalocyanines, bisperylenes, gallium phthalocyanines, and the like. As charge transport molecules there can be selected the aryl diamines disclosed in the '990 patent. Moreover, the developer compositions are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference; and such developers can be selected for digital imaging apparatuses, such as the Xerox Corporation DOCUTECH™.

Images obtained with the toner and developer compositions illustrated herein will, it is believed, possess acceptable solids, excellent halftones and desirable line resolution with acceptable or substantially no background deposits.

The following Examples are being provided to further illustrate the present invention, it being noted that these Examples are intended to illustrate and not limit the scope of the present invention. Parts and percentages are by weight unless otherwise indicated.

EXAMPLE I

One gram of a carbon black, REGAL 330® obtained from Cabot Corporation, was inserted into a 10 milliliter high pressure cell and sealed. The carbon black was then exposed to triethylamine vapor for 30 minutes to activate surface alcohols for reaction, after which the triethylamine was removed by vacuum. The cell was then heated to 50° C. and 8 grams of liquid carbon dioxide were added with the aid of an ISCO Model 260D high pressure syringe pump. After reaching a pressure of 200 bar in the cell, 0.07 gram of aminopropyl triethoxysilane liquid were pumped into the cell with the aid of a high pressure liquid pump. The resulting mixture was then agitated for 30 minutes with a magnetic stir bar while the temperature was maintained at 50° C. The agitation was terminated and the pressurized contents of the cell were removed by the opening of an overhead valve on the cell.

There resulted a carbon black surface treated with 7.0 weight percent of aminopropyl triethoxysilane uniformly over the surface of the carbon black. It was determined that the contact potential difference (or CPD, a measurement described hereinafter) of this carbon black was 0.16 Volts, compared to −0.07 Volts for the untreated REGAL 330® carbon black.

The well-known Kelvin method measures the contact potential difference (CPD), which is the voltage difference produced by the contact of two conductive materials. The CPD arises from the difference in work functions, $\Delta\phi_{s,r}$ of the two conductors, CPD=$\Delta\phi_{s,r}$=$\phi r$−$\phi s$. Here the work functions, $\phi_s$ for the sample, and $\phi_r$ for the reference, are properties of the materials that determine electron donation and electron acceptance abilities, which controls triboelectric charging. The CPD of materials is a predictor of relative triboelectric charging properties. The more negative the CPD, for example, from 0 to −0.5 Volts, the larger the work function, and the more the propensity of a material to accept electrons and to charge negatively. The more positive the CPD, for example from 0 to 0.5 Volts, the smaller the work function and the more likely the material will donate electrons, i.e. to charge positively. The triboelectric charge between two materials will be proportional to the difference in their CPD's, or their work functions.

The CPD was measured in a non-contact mode by creating a circuit using the sample (i.e. the treated carbon black) as one electrode of a parallel plate capacitor separated by a small gap from a reference electrode. Because of a difference in the work function of the two electrodes a charge, q, develops in the capacitor that is equal to C·$\Delta\phi_{s,r}$. The reference electrode was an electrostatic voltmeter. The voltmeter applies a bias voltage, $E_b$, and a periodic vibration to the reference electrode which produces a current in the circuit, i=($\Delta\phi_{s,r}$−$E_b$) dC/dt. By adjusting the voltage to null the current, the bias $E_b$ is then equal to $\Delta\phi_{s,r}$.

A Trek 320B electrostatic voltmeter was used to measure the CPD, using the 10 Volt scale with a precision of ±0.01 Volts. The cells for the sample and reference consist of stainless steel plates, each containing a circular well with a depth of about 5 millimeters, and a diameter of 2 centimeters. The sample (i.e., the treated carbon black) was poured into the sample cell as a powder, then leveled with the edge of a metal spatula. The voltmeter probe was held at constant distance, which typically was 1 to 2 millimeters from the surface of the sample cell. The sample cell and reference cell were interchangeable so that any drift in the voltmeter, or any change in the probe due to contamination, or changes in RH, could be zeroed out.

As a result of this surface modification, there would be expected, it is believed, a change in the triboelectric charging for a toner with the above prepared surface modified carbon black of from 10 to 15 microcoulombs per gram more positive than that achieved with the parent REGAL 330® carbon black alone.

EXAMPLE II

The process of Example I was repeated with 2.0 grams of Pigment Red 81:3 obtained from Sun Chemical instead of REGAL 330®carbon black and 0.63 gram of dimethylaminopropyl trimethoxysilane (DMAPTMS) instead of aminopropyl triethoxysilane.

Therein resulted a surface treated pigment with identical ultraviolet absorption characteristics as the untreated pigment, i.e. the pigment Red 81:3. To obtain these spectra, approximately 3.0 milligrams of the surface treated pigment were placed on a glass plate with 0.2 milliliter of mineral oil as a dispersant. This mixture was then smeared onto the glass plate and placed in a UV spectrometer (a Shimadzu UV-160 UV-Visible Recording Spectrophotometer), and identical spectra resulted.

These identical spectra, as indicated by the equivalence of wavelengths of maximum absorbance for the absorption peaks, indicated that surface treatment in carbon dioxide can proceed without color degradation of the pigment. The surface modified pigment, therefore, can be selected for dry toners or inks.

EXAMPLE III

The process of Example I was repeated with liquid carbon dioxide added at a temperature of 0° C. instead of supercritical fluid carbon dioxide at 50° C.

There resulted a treated carbon black with a CPD identical to that obtained in Example I.

EXAMPLE IV

The process of Example I was repeated with Raven 5750 carbon black in lieu of REGAL 330® and 5.0 weight percent of phenyltrimethoxysilane instead of 7.0 weight percent of aminopropyl triethoxysilane.

There resulted a carbon black with a contact potential difference of 0.23 Volt. A CPD of this magnitude provided for a toner with an increase in positive tribo of 15 to 20 microcoulombs per gram than that obtained with native REGAL 330® carbon black.

Other embodiments and modifications of the present invention may occur to those of ordinary skill in the art subsequent to a review of the present application and the information presented herein; these embodiments and modifications, as well as equivalents thereof, are also included within the scope of this invention.

What is claimed is:

1. A process for the preparation of toner consisting essentially of
   forming a mixture of supercritical carbon dioxide, a colorant, and a surface treating agent for treating said colorant and
   maintaining said mixture at a temperature of from about −10° C. to about 200° C., and optionally removing carbon dioxide.

2. A process in accordance with claim 1 wherein said temperature is from about 0 to about 50° C., and wherein said carbon dioxide is removed.

3. A process in accordance with claim 1 wherein said temperature of from about −10° C. to about 200° C. is maintained for a period of time of from about 5 to about 240 minutes.

4. A process in accordance with claim 1 wherein said temperature of from about −10° C. to about 200° C. is maintained for a period of from about 10 to about 60 minutes.

5. A process in accordance with claim 2 wherein the colorant is a pigment or a dye.

6. A process in accordance with claim 2 wherein the colorant is carbon black.

7. A process in accordance with claim 2 wherein the colorant is cyan, yellow, green, magenta, or mixtures thereof.

8. A process in accordance with claim 1 wherein the colorant is selected in an amount of from about 1 to about 1000 grams per 100 milliliters of reactor volume.

9. A process in accordance with claim 2 wherein the mass ratio amount of carbon dioxide to colorant which mass ratio refers to the grams of carbon dioxide divided by the grams of colorant being treated is from about 0.1:1 to about 20:1.

10. A process in accordance with claim 2 wherein said colorant is of a size diameter of from about 5 to about 500 nanometers.

11. A process in accordance with claim 1 wherein a closed reactor vessel is selected, the temperature in the reactor is maintained at from about 80° C. to about 150° C., and the pressure in the reactor is from about 20 to about 300 bar.

12. A process in accordance with claim 11 wherein the pressure in the reactor is from about 30 to about 50 bar.

13. A process in accordance with claim 11 wherein the reactor contents are stirred with a device operating at a speed of from about 1 to about 200 revolutions per minute, and wherein the reactor is depressurized, and wherein subsequent to depressurization the product is removed.

14. A process in accordance with claim 13 wherein the colorant is a pigment.

15. A process in accordance with claim 14 wherein the amount of pigment is from about 1 to about 300 grams of pigment for every 100 milliliters of reactor volume.

16. A process in accordance with claim 1 wherein the mixture is maintained at a temperature of from about 80° C. to about 150° C.

17. A process in accordance with claim 1 wherein supercritical carbon dioxide is selected and wherein the temperature is at least about 32° C.

18. A process in accordance with claim 1 wherein liquid carbon dioxide is selected and wherein the temperature is below about 32° C.

19. A process in accordance with claim 1 wherein there is enabled substantially no color degradation.

20. A process for the preparation of a colorant, and which colorant is substantially free of color degradation, the process comprising maintaining a mixture of carbon dioxide and colorant at a temperature of from about −10° C. to about 200° C.

21. A process in accordance with claim 20 wherein said carbon dioxide is liquid carbon dioxide.

22. A process in accordance with claim 20 wherein said temperature is about 0 to about 40° C.

23. A process in accordance with claim 20 wherein the colorant is a pigment with a size diameter of about 0.01 to about 1 micron in volume average diameter.

24. A process in accordance with claim 20 wherein said mixture contains a surface treating reagent.

25. A process in accordance with claim 24 wherein said surface treating reagent is aminopropyl triethoxysilane.

26. A process which comprises maintaining a mixture of carbon dioxide, surface treating reagent and colorant at a temperature of from about −10° C. to about 100° C.

27. A process in accordance with claim 1 wherein subsequent to maintaining at said temperature cooling is accomplished to about 30° C. from about 35° C. to about 200° C.

28. A process in accordance with claim 1 wherein the surface treating agent is a silane.

29. A process in accordance with claim 1 wherein said surface treating agent is a silane.

30. A process in accordance with claim 29 wherein said silane is dimethylaminopropyl trimethoxysilane, diethylphosphatoethyl triethoxysilane, carboxymethyl triethoxysilane, and aminopropyl triethoxysilane.

31. A process in accordance with claim 29 wherein said silane is an alkylalkoxy silane.

32. A process in accordance with claim 31 wherein said alkylalkoxy is octyltriethoxysilane, decyltrimethoxysilane or isobutyltrimethoxysilane.

33. A process in accordance with claim 1 wherein said treating agent is a chlorosilane.

34. A process for the preparation of toner which comprises admixing resin and colorant, and wherein said colorant is obtained by mixing supercritical carbon dioxide, colorant and a surface treating agent for treating said colorant at a temperature of from about −10° C. to about 200° C., and wherein said colorant is substantially free of color degredation.

35. A process in accordance with claim 34 wherein said surface treating agent is a silane.

* * * * *